(12) United States Patent
Ko et al.

(10) Patent No.: US 8,064,324 B2
(45) Date of Patent: Nov. 22, 2011

(54) ELECTRIC FIELD EFFECT READ/WRITE HEAD, METHOD OF MANUFACTURING THE SAME, AND ELECTRIC FIELD EFFECT STORAGE APPARATUS HAVING THE SAME

(75) Inventors: Hyoung-soo Ko, Seoul (KR);
Seung-bum Hong, Seongnam-si (KR);
Chul-min Park, Yongin-si (KR);
Dae-young Jeon, Mokpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 12/126,427

(22) Filed: May 23, 2008

(65) Prior Publication Data
US 2009/0141396 A1 Jun. 4, 2009

(30) Foreign Application Priority Data
Nov. 29, 2007 (KR) .......................... 10-2007-0122734

(51) Int. Cl.
*G11B 9/00* (2006.01)

(52) U.S. Cl. ........................................................ 369/126
(58) Field of Classification Search .................. 369/126, 369/101, 13.01, 14; 365/145; 977/943, 947
See application file for complete search history.

(56) References Cited

U.S. PATENT DOCUMENTS

| | | | |
|---|---|---|---|
| 5,321,685 A * | 6/1994 | Nose et al. | 369/126 |
| 5,610,783 A * | 3/1997 | Maffitt et al. | 360/234.5 |
| 2002/0001283 A1 * | 1/2002 | Niwa et al. | 369/112.27 |
| 2005/0231225 A1 * | 10/2005 | Park et al. | 324/762 |

* cited by examiner

*Primary Examiner* — Joseph Haley
*Assistant Examiner* — Nicholas Lee
(74) *Attorney, Agent, or Firm* — Sughrue Mion, PLLC

(57) ABSTRACT

An electric field effect read/write head for recording/reproducing information on/from a ferroelectric recording medium using an electric field effect includes a semiconductor substrate, a recess portion formed in an upper surface of the semiconductor substrate facing the ferroelectric recording medium, and a recording/reproduction portion provided in the recess portion.

13 Claims, 9 Drawing Sheets

ELECTRIC FIELD EFFECT READ/WRITE HEAD, METHOD OF MANUFACTURING THE SAME, AND ELECTRIC FIELD EFFECT STORAGE APPARATUS HAVING THE SAME

CROSS-REFERENCE TO RELATED PATENT APPLICATIONS

This application claims the benefit of Korean Patent Application No. 10-2007-0122734, filed on Nov. 29, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to an electric field read/write head, manufacturing the electric field read/write head, and a storage unit including the electric field read/write head.

2. Description of the Related Art

A hard disk drive (HDD), that is, the main memory device of a computer, reads/writes information from/to a rotating recording medium using a magnetic read/write head. That is, the HDD produces a plurality of magnetic domains magnetized in a first direction and a second direction opposite to the first direction on a magnetic recording medium using a magnetic field and matches data "0" to a magnetic domain magnetized in the first direction and data "1" to a magnetic domain magnetized in the second direction.

The recording density of the HDD using a magnetic recording method has been sharply increasing in recent years. In the case of an HDD of a horizontal magnetic recording type, a recording density of about 100 Gb/in$^2$ can be obtained. In the case of an HDD of a vertical magnetic recording type, a recording density of about 500 Gb/in$^2$ can be obtained. In this regard, there is a limit in increasing the recording density because it is difficult to generate a strong local magnetic field using the magnetic read/write head.

Recently, studies on a ferroelectric recording medium where data is recorded not by a magnetic field but by an electric field and an electric field sensor for recording/reproducing on/from the ferroelectric recording medium have been conducted. In an electric field effect recording method, a plurality of electric domains are polarized in a first direction and a second direction opposite to the first direction on the surface of ferroelectrics media using an electric field and the electric domains polarized in the first and second directions are respectively matched to data "0" and "1". Since the resistance of an electric field sensor located above the electric domains changes according to the polarization direction of each electric domain, the amount of current flowing between a source electrode and a drain electrode of the electric field sensor varies. Information written to the electric domain can be determined by detecting the change in the amount of current. Also, in the electric field effect read/write method, a high recording density of over 1 Tb/in$^2$ can be theoretically obtained.

SUMMARY OF THE INVENTION

To solve the above and/or other problems, the present invention provides an electric field effect read/write head capable of reading/writing information from/to a ferroelectric recording medium, a method of manufacturing the electric field effect read/write head, and an electric field effect storage apparatus including the electric field effect read/write head.

According to an aspect of the present invention, an electric field effect read/write head for recording/reproducing information on/from a ferroelectric recording medium using an electric field effect comprises a semiconductor substrate, a recess portion formed in an upper surface of the semiconductor substrate facing the ferroelectric recording medium, and a recording/reproduction portion provided in the recess portion.

According to another aspect of the present invention, an electric field effect storage apparatus comprises a ferroelectric recording medium and an electric field effect read/write head floating above the ferroelectric recording medium and recording/reproducing information on/from the ferroelectric recording medium using an electric field effect, wherein the read/write head comprises a semiconductor substrate, a recess portion formed in an upper surface of the semiconductor substrate facing the ferroelectric recording medium, and a recording/reproduction portion provided in the recess portion.

An air bearing pattern is formed on the upper surface of the semiconductor substrate.

The recording/reproduction portion protrudes toward a recording surface of the ferroelectric recording medium to a height smaller than the air bearing pattern.

The recording/reproduction portion includes a resistance region that is a low doped region and a source region and a drain region that are highly doped regions and separated by the resistance region.

The resistance region has a probe shape protruding toward the recording surface of the ferroelectric recording medium.

The recording/reproduction head further comprises first and second contact pads that electrically contact the source region and the drain region, respectively.

The first and second contact pads electrically contact the source region and the drain region from a bottom surface of the semiconductor substrate.

According to another aspect of the present invention, a method of manufacturing an electric field effect read/write head comprises: patterning a mask on a semiconductor substrate, and defining first and second regions formed as upper surfaces of the semiconductor substrate that are exposed and a third region located between the first and second regions and covered by the mask; forming a low resistance semiconductor region in each of the first and second regions and a high resistance semiconductor region in the third region by implanting a dopant in the first and second regions and diffusing the dopant to the third region; removing a part of the mask covering the third region; forming a recess on the upper surface of the semiconductor substrate by etching exposed parts of the first, second, and third regions using an anisotropic etch process; and entirely removing the mask.

The method further comprises forming first and second contact pads electrically contacting the first and second regions, respectively.

The forming of the first and second contact pads comprises forming first and second contact holes to expose the first and second regions by etching a part of the semiconductor substrate from a bottom surface thereof, and depositing a metal material in the first and second contact holes.

The method further comprises forming an air bearing pattern on the upper surface of the semiconductor substrate.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, with reference to the accompanying drawings, an electric field effect read/write head according to the present invention, an electric field effect storage apparatus including the electric field effect read/write head, and a method of manufacturing the electric field effect read/write head will be described. Also, in the drawings, like reference numerals denote like elements.

Figure 1:
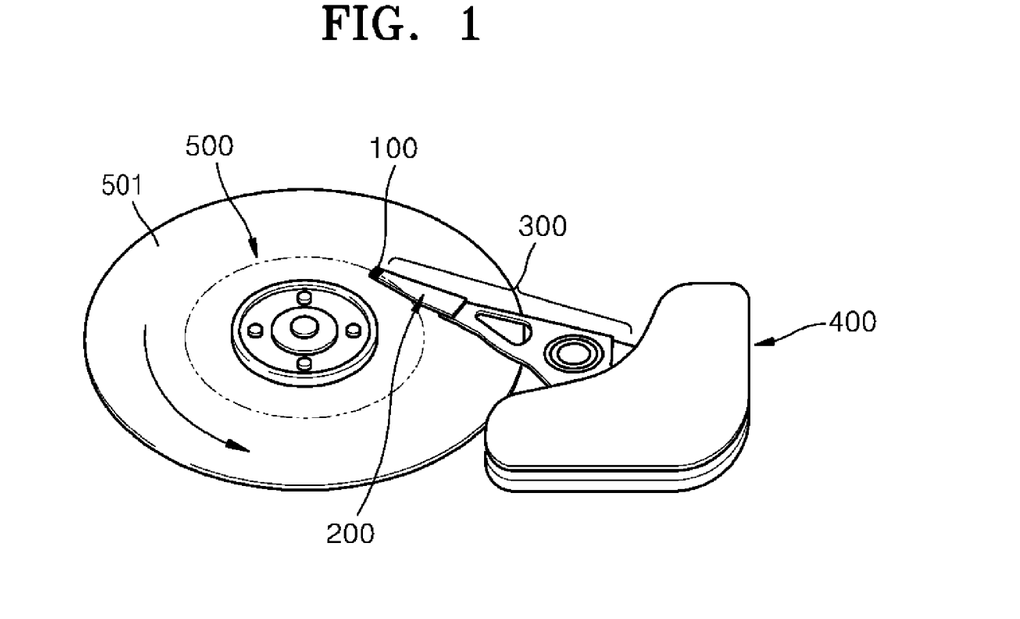
FIG. 1 illustrates a configuration of an electric field effect storage apparatus according to an exemplary embodiment of the present invention.

FIG. 1 illustrates a configuration of an electric field effect storage apparatus according to an exemplary embodiment of the present invention. The electric field effect storage apparatus of the present exemplary embodiment is an HDD type storage device having a rotatable disc type recording medium 500. The recording medium 500 is a ferroelectric recording medium. Although it is not shown in the drawings, the recording medium 500 includes a substrate on which a lower electrode and a ferroelectric layer are sequentially formed. The substrate can be formed of Si and glass. The lower electrode can be formed of an electrode material used for a semiconductor memory device, for example, a metal such as Pt, Al, Au, Ag, or Cu and a metal oxide such as $SrRuO_3$ or $(La,Sr)CoO$. The lower electrode is grounded. The ferroelectric layer can be formed of a ferroelectric material, for example, PZT $(PbZr_xTi_{1-x}O_3)$, $PbTiO_3$, $PbZrO_3$, $SrBi2Ta_2O_9$(SBT), $KNbO_3$, $LiTaO_3$, or $LiNbO_3$. A protective layer can be further provided on the ferroelectric layer. The protective layer can be formed of a diamond like carbon (DLC). Also, the protective layer can be formed together with a lubricant that is typically used on the surface of a hard disk and the DLC.

An electric field effect read/write head 100 is installed at a suspension arm 200 provided at an end of a swing arm 300. The swing arm 300 is rotated by a voice coil motor 400. When the recording medium 500 is rotated, the electric magnetic effect read/write head 100 is lifted from the surface of the recording medium 500 by an air bearing effect. A drive system of the electric field effect storage apparatus of FIG. 1 is the same as that of a conventional HDD. However, in the electric field effect storage apparatus of the present invention, a magnetic recording medium and a magnetic read/write head of the conventional HDD are, respectively, replaced by the ferroelectric recording medium and the electric field effect read/write head.

Figure 2:
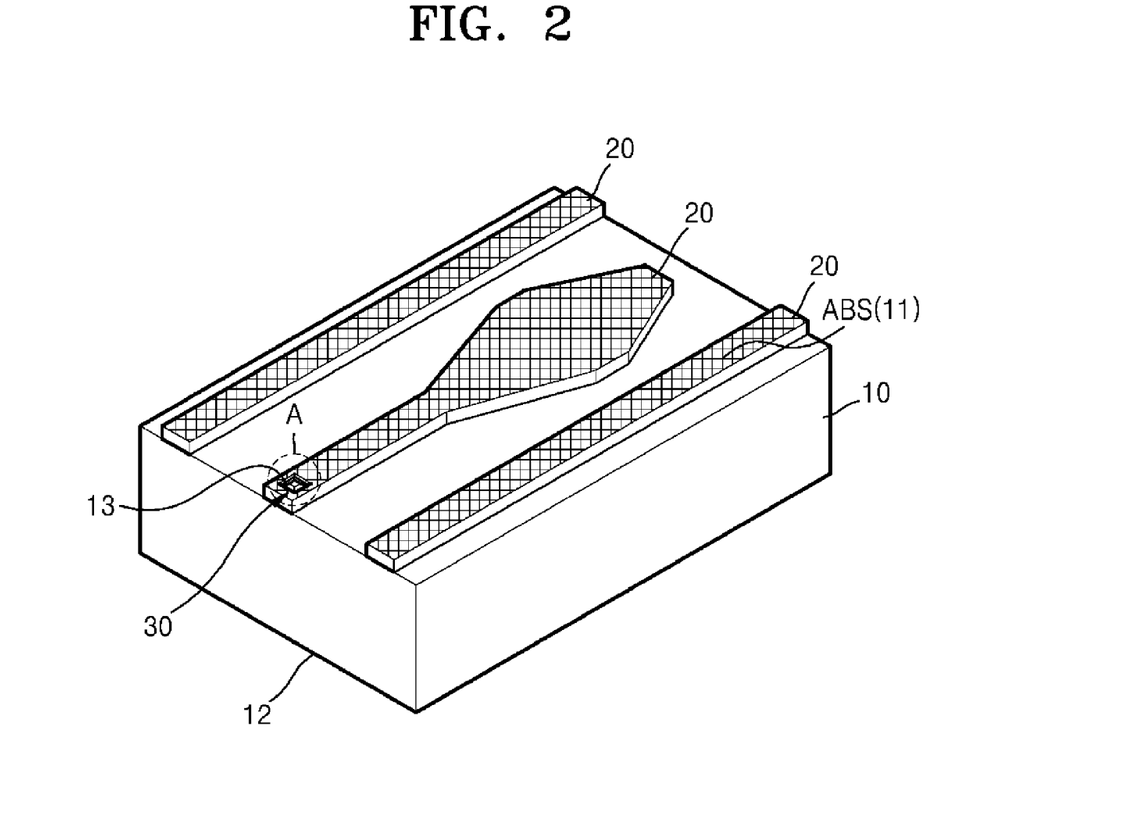
FIG. 2 illustrates a configuration of an electric field effect read/write head according to an exemplary embodiment of the present invention.
Figure 3:
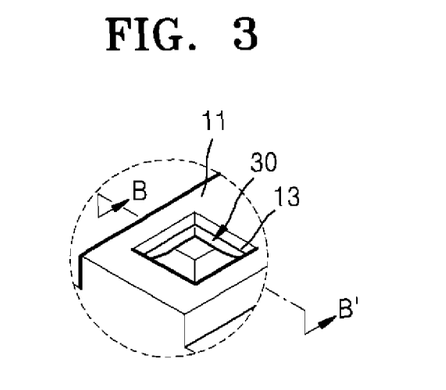
FIG. 3 illustrates in detail a portion A of FIG. 2.
Figure 4:
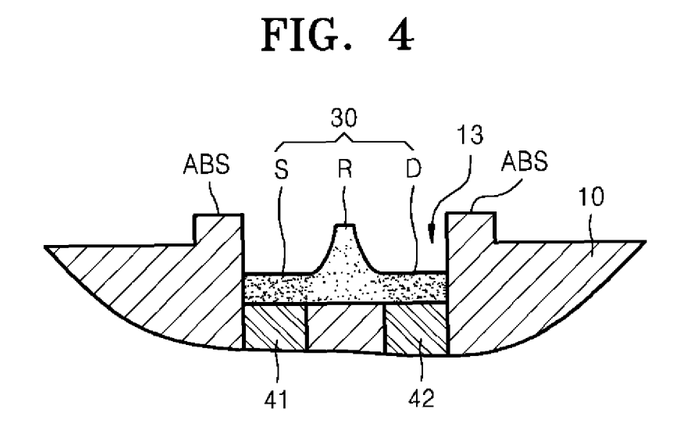
FIG. 4 is a cross-sectional view taken along line B-B' of FIG. 3.

FIG. 2 illustrates a configuration of an electric field effect read/write head according to an exemplary embodiment of the present invention. FIG. 3 illustrates in detail a portion A of FIG. 2. FIG. 4 is a cross-sectional view taken along line B-B' of FIG. 3. Referring to FIGS. 2 and 3, an air bearing pattern 20 is formed on an upper surface 11 of the body 10. The upper surface 11 of the body 10 faces a recording surface 501 of the recording medium 500. The air bearing pattern 20 guides the flow of air so that the electric field effect read/write head 100 is lifted above the surface of the recording medium 500. When the air bearing pattern 20 is formed by removing a part of the upper surface 11 of the body 10, the upper surface 11 of the body 10 works as an air bearing surface (ABS). Since the air bearing pattern is a well-known technology applied to an HDD using a magnetic recording/reproduction method, a detailed description thereof will be omitted. A recess portion 13 is formed in the upper surface 11 of the body 10. A recording/reproduction portion 30, i.e., a writing/reading portion, for performing electric field effect recording and reproduction is provided in the recess portion 13. All or part of the body 10 can be a semiconductor substrate. When only a part of the body 10 is a semiconductor substrate, at least a portion of the body 10 where the recess portion 13 and the recoding/reproduction portion 30 are formed must belong to the semiconductor substrate. In the following description, it is assumed that the entire body 10 is a semiconductor substrate and the body 10 is referred to as the semiconductor substrate 10.

Referring to FIGS. 3 and 4, the recording/reproduction portion 30 includes a resistance region R, a source region S, and a drain region D. The source region S and the drain region D are highly doped regions. The resistance region R is located between the source region S and the drain region D and is a low doped region. For example, when the semiconductor substrate 10 is a p-type semiconductor substrate, the resistance region R is an n− type doped region and the source and drain regions S and D are n+ type doped regions. Reversely, when the semiconductor substrate 10 is an n-type semiconductor substrate, the resistance region R is a p− type doped region and the source and drain regions S and D are p+ type doped regions. For example, phosphorus P and arsenic As can be used as a n-type dopant while boron B can be used as a p-type dopant.

The recording/reproduction portion 30 is a probe protruding upwardly from the bottom surface of the recess portion 13. That is, as shown in FIG. 4, the source region S and the drain region D form the bottom surface of the recess portion 13 and the resistance region R protrudes sharply upwardly from the bottom surface of the recess portion 13. First and second contact pads 41 and 42 penetrate the semiconductor substrate 10 from the bottom surface 12 of FIG. 2 to electrically contact the source region S and the drain region D, respectively.

Figure 5:
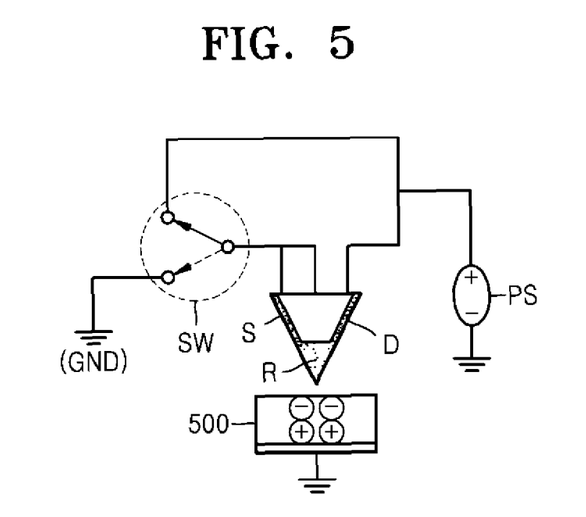
FIG. 5 is a circuit diagram for explaining the read/write principle when using the electric field effect read/write head.

FIG. 5 is a circuit diagram for explaining the read/write principle when the electric field effect read/write head is operating. For a reproduction operation, a switch SW is connected to ground as indicated by a dotted arrow. In the circuit diagram of FIG. 5, the resistance region R works as a gate to control the amount of current flowing to the source region S and the drain region D according to its semiconductor characteristic. Electrons are accumulated or depleted in the resistance region R according to the polarity of an electric field acting to the resistance region R. Accordingly, the resistance value of the resistance region R is decreased or increased.

Figure 6A:
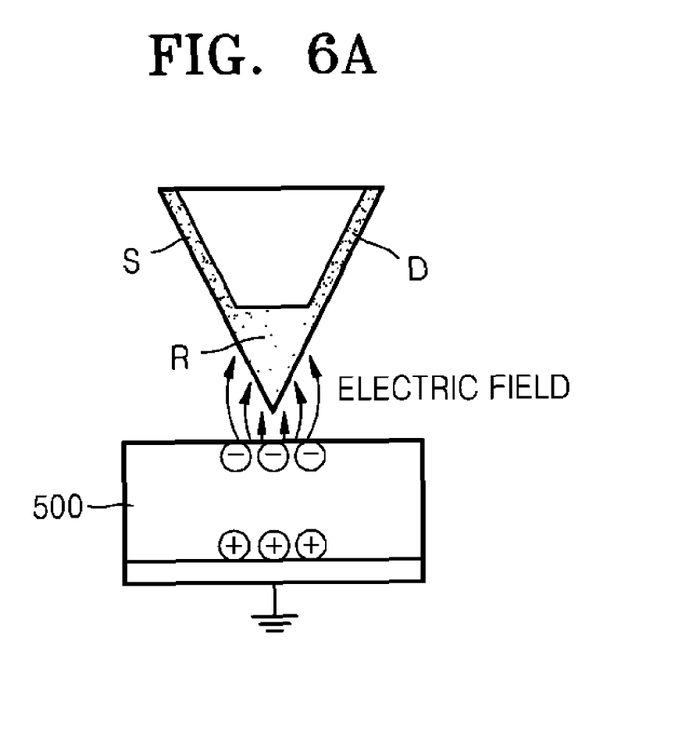
FIGS. 6A and 6B explain the principle of reading data when using the electric field effect read/write head.
Figure 6B:
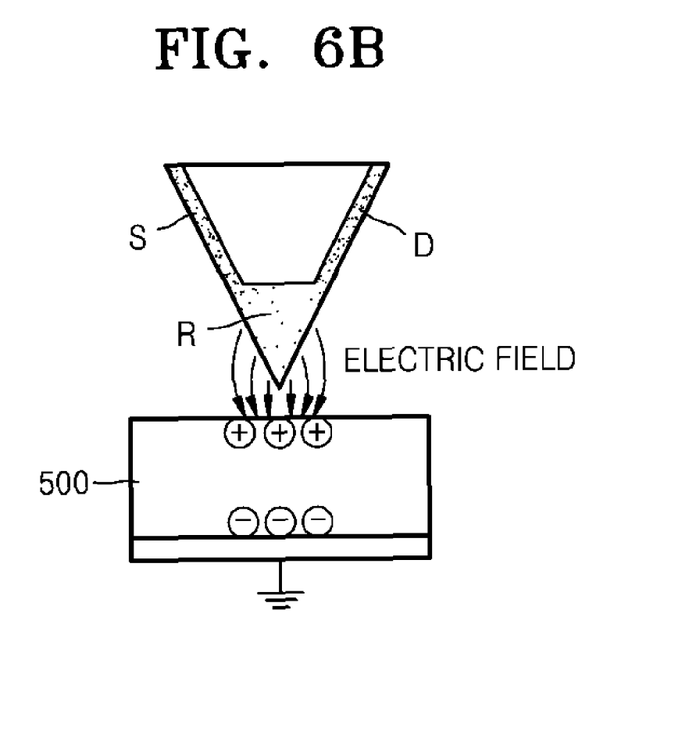

In detail, referring to FIG. 6A, when the resistance region R is an n-type doped region, the electric domain of the recording medium 500 facing the resistance region R is polarized in a first polarization direction. When the surface charge of the recording medium 500 is negative, the density of electrons in the resistance region R decreases so that the resistance value of the resistance region R increases. Then, the amount of current flowing across the resistance region R decreases. On the other hand, as shown in FIG. 6B, when the electric domain of the recording medium 500 facing the resistance region R is polarized in a second polarization direction so that the surface charge thereof is positive (+), the density of electrons in the resistance region R increases so that the resistance value of the resistance region R decreases. Then, the amount of current flowing across the resistance region R increases. Thus, the information recorded on the surface of the recording medium 500 can be read based on a change in the current amount. The above-described operation is reversed when the resistance region R is an p-type doped region.

The recording operation refers to recording information by causing polarization of the recording medium 500. For this purpose, as indicated by a solid arrow in FIG. 5, the switch SW is connected to a power supply PS. The power supply PS supplies a voltage whose absolute value is greater than the absolute value of a critical voltage at which the recording medium 500 is polarized. Accordingly, as the electric domain of the recording medium 500 is polarized in the first or second polarization direction, information can be recorded on the recording medium 500.

When the electric field effect read/write head 100 configured as above is used, a tip end of the resistance region R can be formed to be very small. This means that a recording density can be greatly increased. A lithography method is used to fabricate the resistance region R. Even when lithography equipment having a resolution of several micrometers is used, the tip end of the resistance region R can be made in a size of about several to tens of nanometers. As a result, a recording track width of about 50 nanometers can be achieved.

Also, since the air bearing pattern 20 can be formed on the upper surface 11 of the semiconductor substrate 10, the recording/reproduction portion 30 is not highly likely to be damaged during a process of forming the air bearing pattern 20. In the following description, a method of forming the electric field effect read/write head 30 is described when the semiconductor substrate 10 is a p-type semiconductor substrate including silicon as a base material.

Figure 7A:
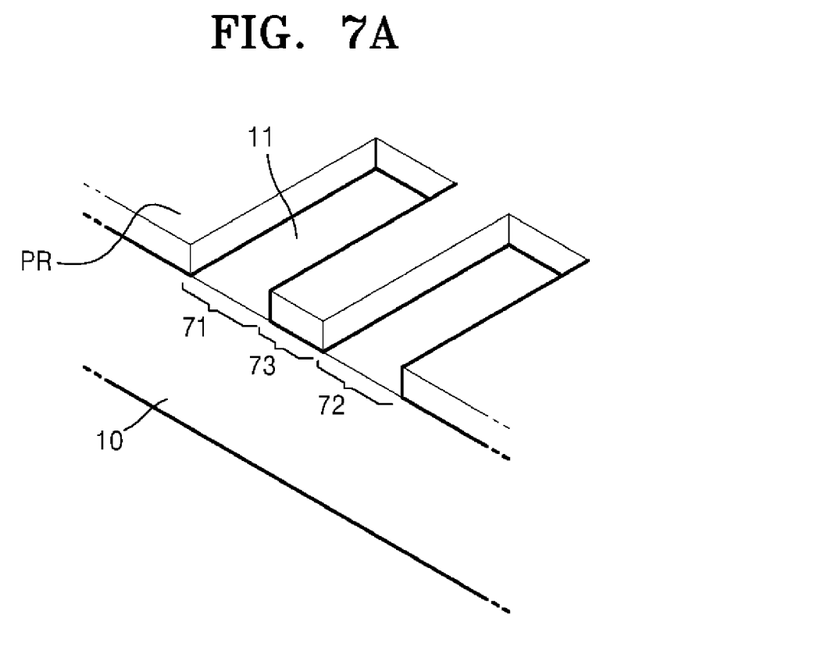
FIGS. 7A-7H show the manufacturing process of the electric field effect read/write head according to the present invention.

As shown in FIG. 7A, first, second, and third regions 71, 72, and 73 are defined by patterning a mask PR on the upper surface 11 of the semiconductor substrate 10. The first and second regions 71 and 72 are exposed areas of the upper surface 11 of the semiconductor substrate 10. The third region 73 is located between the first and second regions 71 and 72. The upper surface 11 of the semiconductor substrate 10 of the third region 73 is covered by the mask PR. This process can be performed using a typical lithography method. The mask PR is, for example, a photoresist.

Figure 7B:
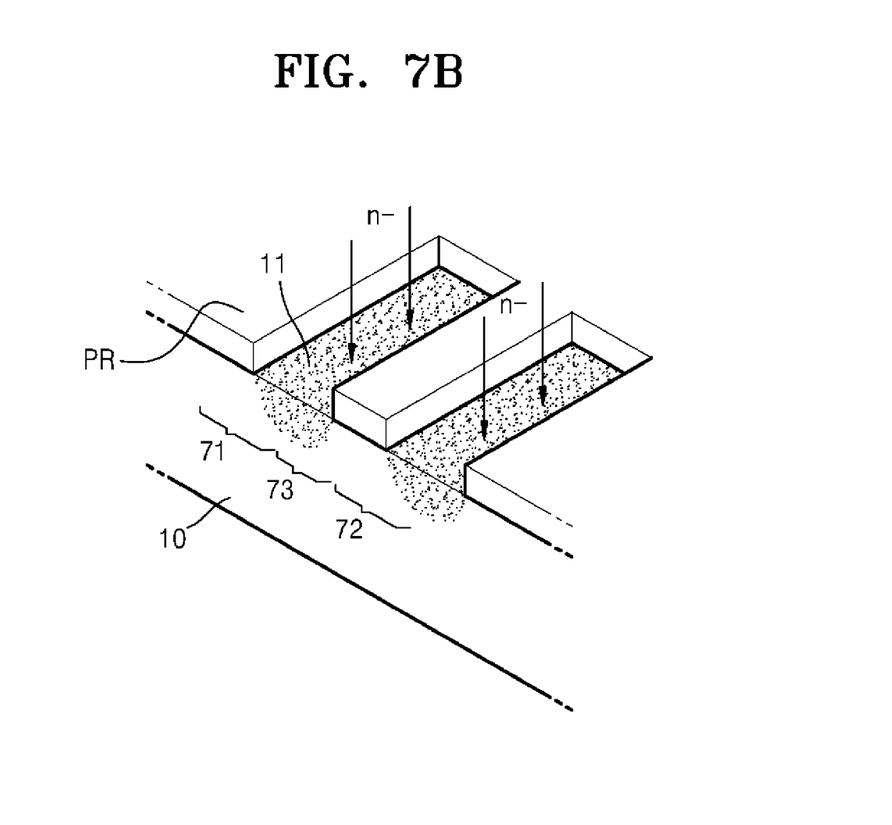

Next, as shown in FIG. 7B, a dopant is implanted in the upper surface 11 of the semiconductor substrate 10 corresponding to the first and second regions 71 and 72 using the mask PR as an ion implantation mask. The dopant is an n-type dopant because the semiconductor substrate 10 is a p-type semiconductor substrate.

Figure 7C:
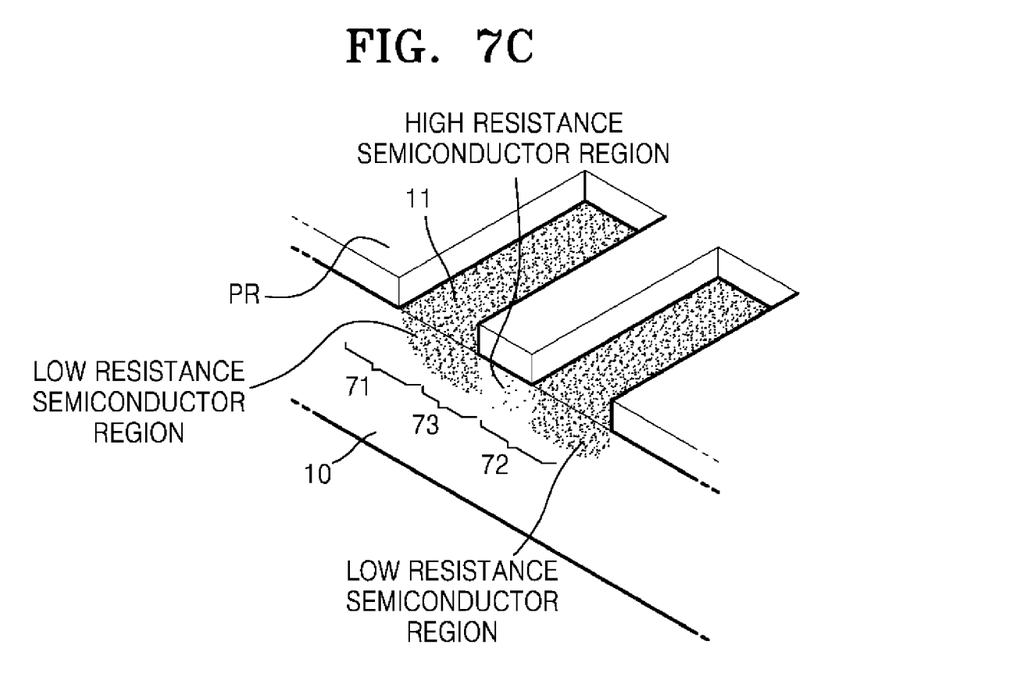

Then, the dopant is diffused by annealing. Then, as shown in FIG. 7C, the dopant is diffused into the third region 73. By the above doping and diffusing processes, the first and second regions 71 and 72 become highly doped low resistance semiconductor regions while the third region 73 becomes a low doped high resistance semiconductor region.

Figure 7D:
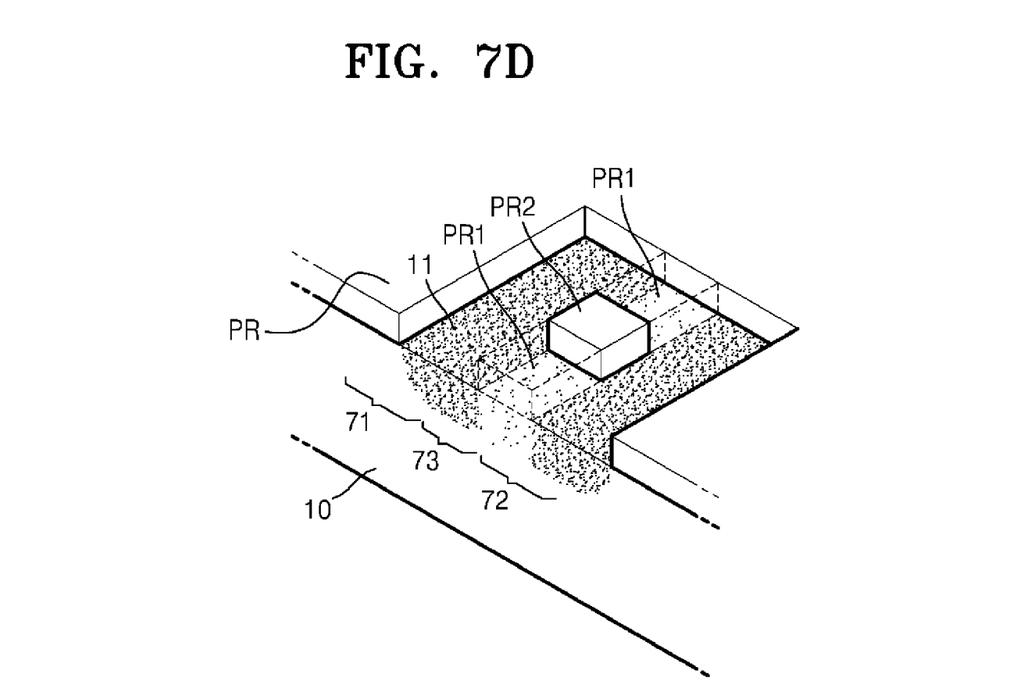

Next, as shown in FIG. 7D, a part PR1 of the mask PR covering the third region 73 is removed. That is, a mask PR2 is left only in an area where the tip end of the resistance region R is located.

Figure 7E:
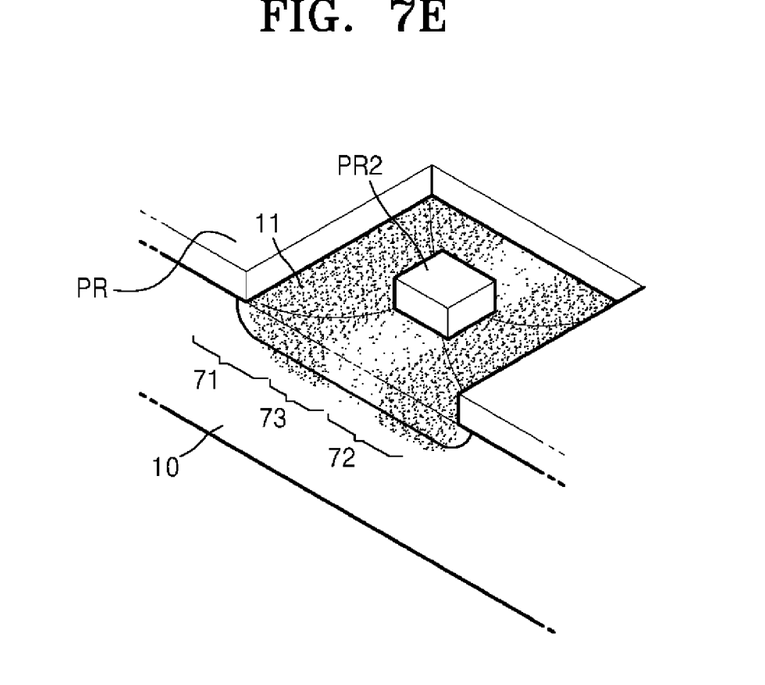

The semiconductor substrate 10 where the first, second, and third regions 71, 72, and 73 are exposed is etched using the mask PR and the mask PR2 as etch masks. In an exemplary embodiment, an anisotropic etch process is used. Then, as shown in FIG. 7E, the semiconductor substrate 10 is overetched under the masks PR and PR2 so that a top portion of the third region 73 is made sharp or is made to have a protruding shape.

Figure 7F:
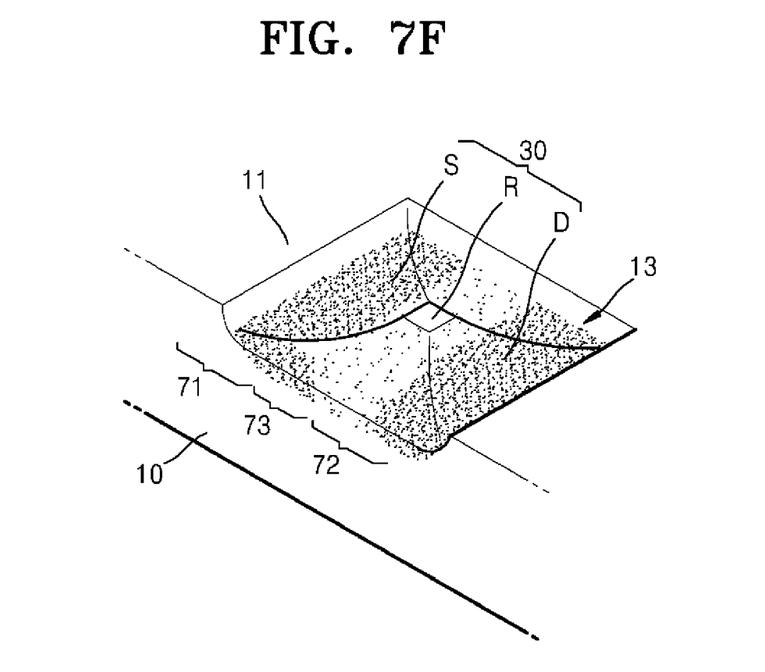

The masks PR and PR2 are removed. Then, as shown in FIG. 7F, the recording/reproduction portion 30 having the resistance region R having a sharp upper end and the source region S and the drain region D located at both sides of the resistance region R is completed. Also, the recording/reproduction portion 30 is located in the recess portion 13 formed in the upper surface 11 of the semiconductor substrate 10.

Figure 7G:
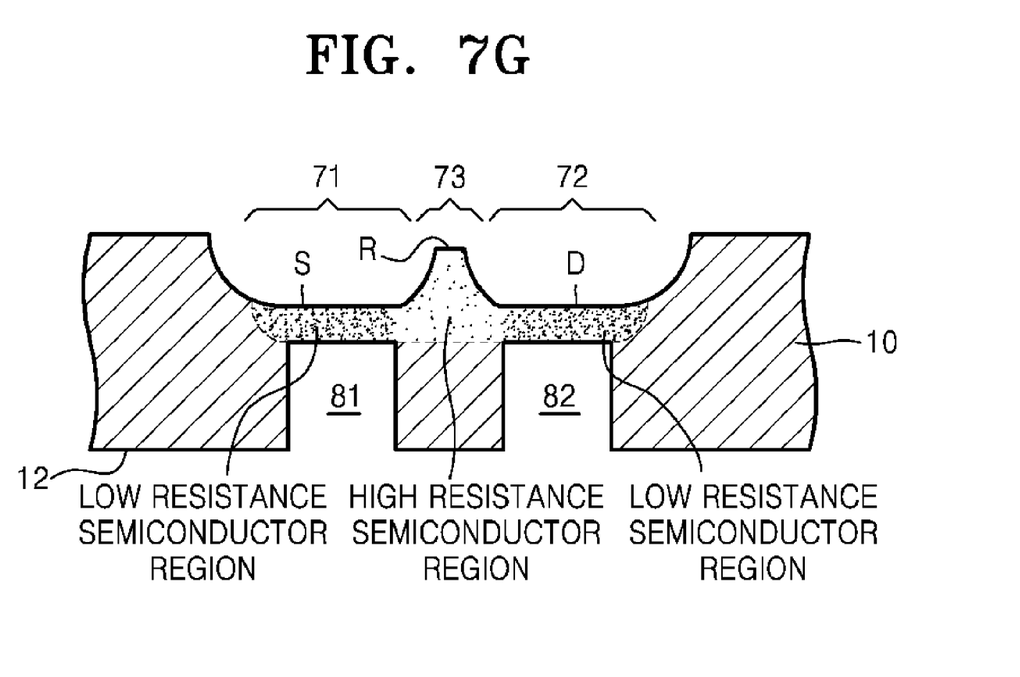
Figure 7H:
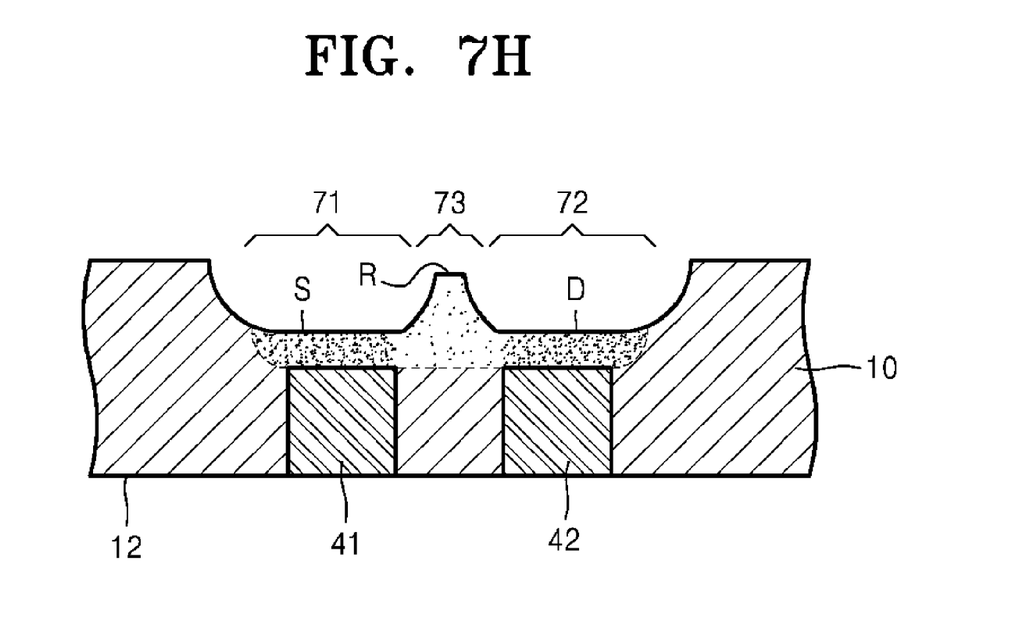

The process of forming the first and second contact pads 41 and 42 electrically connecting the source region S and the drain region D is described below. In the present exemplary embodiment, since the upper surface 11 of the semiconductor substrate 10 faces the recording medium 500, it is not preferable to form the first and second contact pads 41 and 42 on the upper surface 11 of the semiconductor substrate 10. Thus, as shown in FIG. 7G, first and second contact holes 81 and 82 that expose the first and second regions 71 and 72, preferably, but not necessarily, a high resistance semiconductor region, are formed by etching the semiconductor substrate 10 from the bottom surface 12 thereof. Then, the first and second contact holes 81 and 82 are filled with a metal material. As a result, the first and second contact pads 41 and 42 electrically contacting the source region S and the drain region D are completed as shown in FIG. 7H.

Figure 8:
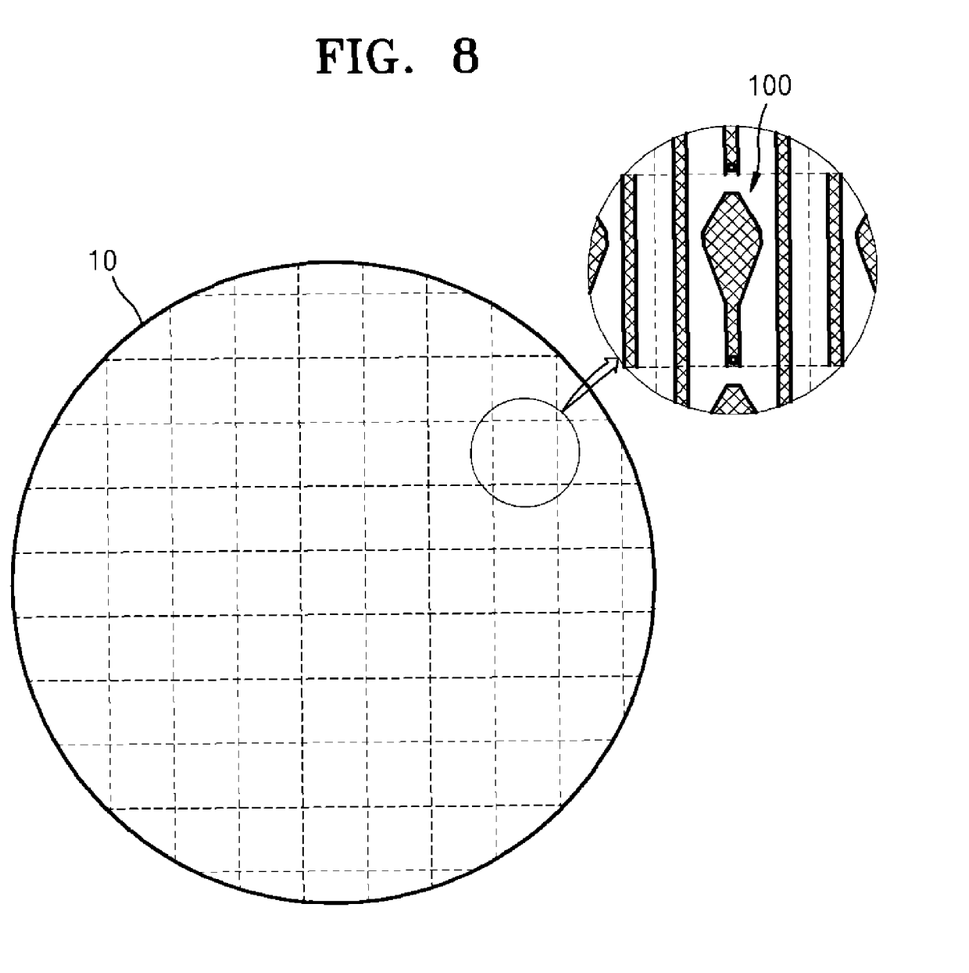
FIG. 8 illustrates a state in which a plurality of electric field effect read/write heads are manufactured on a semiconductor substrate according to the manufacturing process of FIGS. 7A-7H.

The air bearing pattern 20, as shown in FIG. 2, is formed by etching a part of the upper surface 11 of the semiconductor substrate 10. According to the above manufacturing process, a plurality of electric field effect read/write heads 100 are manufactured on the single semiconductor substrate 10, as shown in FIG. 8. Then, the electric field effect read/write heads 100 are completed as shown in FIG. 2 by cutting the semiconductor substrate 10 along a cut line.

Figure 9:
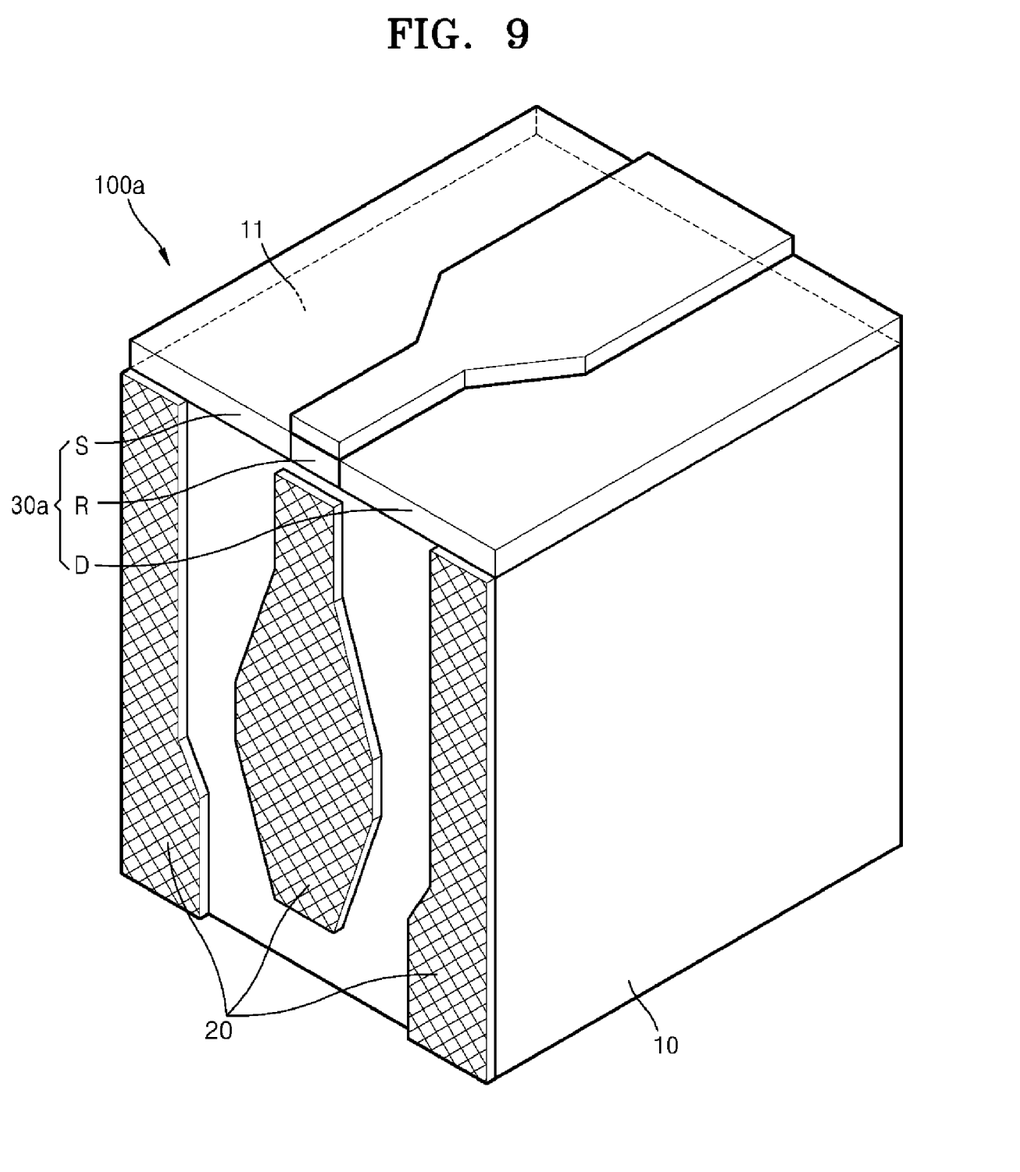
FIG. 9 illustrates an example of an electric field effect read/write head manufactured by laminating a recording/reproducing portion on a substrate.

When a recording/reproduction portion 30a is formed on the upper surface 11 of the semiconductor substrate 10 in a laminating method as shown in FIG. 9, the semiconductor substrate 10 is cut to separate an electric field effect read/write head 100a and the air bearing pattern 20 needs to be formed on a cut surface. In this case, a mechanical and/or chemical polishing process is needed. Thus, the recording/reproduction portion 30a may be damaged in the process of forming the air bearing pattern 20. However, in the electric field effect read/write head 100 according to the present invention, since the air bearing pattern 20 can be formed on the upper surface 11 of the semiconductor substrate 10 in the etch process, a possibility of damaging to the recording/reproduction portion 30 is very low. Also, since the process of forming the air bearing pattern 20 can be continuously performed in the process of forming the recording/reproduction portion 30, process efficiency can be improved.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An electric field effect read and write head for recording and reading information on and from a ferroelectric recording medium using an electric field effect, the read and write head comprising:
   a semiconductor substrate;
   a recess disposed at an upper surface of the semiconductor substrate facing the ferroelectric recording medium; and
   a recording and reading portion disposed in the recess,
   wherein the recording and reading portion comprises a resistance region, a source region and a drain region,
   wherein the source region and the drain region are formed in a bottom surface of the recess and the resistance region is formed as a portion protruding from the bottom surface of the recess, and
   wherein the recording and reading head further comprises a first contact pad and a second contact pad that electrically contact the source region and the drain region, respectively, from a bottom surface of the semiconductor substrate.

2. The electric field effect read and write head of claim 1, wherein an air bearing pattern is disposed at the upper surface of the semiconductor substrate.

3. The electric field effect read and write head of claim 2, wherein the recording and reading portion protrudes toward a recording surface of the ferroelectric recording medium at a height less than a height of the air bearing pattern.

4. The electric field effect read and write head of claim 1, wherein the resistance region comprises a low doped region, the source region comprises a first highly doped region, the drain region comprises a second highly doped region, and the source and the drain regions are separated by the resistance region.

5. The electric field effect read and write head of claim 4, wherein the resistance region comprises a probe shape protruding toward a recording surface of the ferroelectric recording medium.

6. An electric field effect storage apparatus comprising:
   a ferroelectric recording medium; and
   a head disposed above the ferroelectric recording medium, and recording and reading information on and from the ferroelectric recording medium using an electric field effect,
   wherein the head comprises:
   a semiconductor substrate;
   a recess disposed at an upper surface of the semiconductor substrate, facing the ferroelectric recording medium; and
   a recording and reading portion provided in the recess,
   wherein the recording and reading portion comprises a resistance region, a source region and a drain region,
   wherein the source region and the drain region are formed in a bottom surface of the recess and the resistance region is formed as a portion protruding from the bottom surface of recess, and
   wherein the head further comprises a first contact pad and a second contact pad that electrically contact the source region and the drain region, respectively, from a bottom surface of the semiconductor substrate.

7. The electric field effect storage apparatus of claim 6, wherein an air bearing pattern is formed on the upper surface of the semiconductor substrate.

8. The electric field effect storage apparatus of claim 7, wherein the recording and reading portion protrudes toward a recording surface of the ferroelectric recording medium at a height less than a height of the air bearing pattern.

9. The electric field effect storage apparatus of claim 6, the resistance region comprising a low doped region, and the source region comprises a first highly doped region, the drain region comprises a second highly doped region, and the source and the drain regions are separated by the resistance region.

10. The electric field effect storage apparatus of claim 9, wherein the resistance region comprises a probe shape protruding toward the recording surface of the ferroelectric recording medium.

11. A device for recording information on and reading information from a ferroelectric recording medium, the device comprising:
   a substrate;
   a first member disposed on a top surface of the substrate, the first member comprising:
   an upper surface that is higher than the top surface of the substrate; and
   an opening disposed at an end of the first member, the opening formed by surfaces of the first member; and
   a writing and reading unit disposed in the opening of the first member,
   wherein the writing and reading unit comprises a resistance region, a source region and a drain region,
   wherein the top surface of the substrate comprises a depression disposed below the opening of the first member, the opening and the depression form a recess,
   wherein the source region and the drain region are formed in a bottom surface recess and the resistance region is formed as a portion protruding from the bottom surface of the recess, and
   wherein the device further comprises a first contact pad and a second contact pad that electrically contact the source region and the drain region, respectively, from a bottom surface of the substrate.

12. The device of claim 11, wherein the opening is surrounded by the surfaces of the first member.

13. The device of claim 12, wherein the first member is an air bearing surface.

* * * * *